(12) United States Patent
Kurumado (10) Patent No.: US 7,459,905 B2
(45) Date of Patent: Dec. 2, 2008

(54) ROTATION DETECTOR HAVING SENSOR CHIP AND BIASING MAGNET

(75) Inventor: Norihiro Kurumado, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/528,613

(22) Filed: Sep. 28, 2006

(65) Prior Publication Data

US 2007/0075705 A1  Apr. 5, 2007

(30) Foreign Application Priority Data

Sep. 30, 2005  (JP) .............................. 2005-288245

(51) Int. Cl.
*G01R 7/30* (2006.01)
(52) U.S. Cl. ............. 324/207.25; 324/174; 324/207.21; 324/207.2
(58) Field of Classification Search . 324/207.2–207.25, 324/173, 174; 338/32 R, 32 H
See application file for complete search history.

(56) References Cited

U.S. PATENT DOCUMENTS

| | | | | |
|---|---|---|---|---|
| 5,637,995 | A * | 6/1997 | Izawa et al. ................. | 324/174 |
| 5,698,778 | A * | 12/1997 | Ban et al. ................... | 73/118.1 |
| 6,486,764 | B2 * | 11/2002 | Byram ....................... | 336/110 |
| 6,844,719 | B2 * | 1/2005 | Tsuge et al. ................ | 324/174 |

FOREIGN PATENT DOCUMENTS

| | | |
|---|---|---|
| JP | A-09-005017 | 1/1997 |
| JP | A-H09-79865 | 3/1997 |
| JP | A-H09-196701 | 7/1997 |
| JP | A-H11-166840 | 6/1999 |
| JP | A-2001-116815 | 4/2001 |
| JP | A-2001-183385 | 7/2001 |
| JP | A-2002-236158 | 8/2002 |
| JP | A-2003-086733 | 3/2003 |
| JP | A-2003-294486 | 10/2003 |
| JP | A-2004-014637 | 1/2004 |
| JP | A-2005-049095 | 2/2005 |
| JP | A-2005-049285 | 2/2005 |

OTHER PUBLICATIONS

Notice of Reasons for Rejection mailed Jul. 8, 2008 in corresponding Japanese Patent Application No. 2005-288245 (English translation attached).

* cited by examiner

*Primary Examiner*—Jay M Patidar
(74) *Attorney, Agent, or Firm*—Posz Law Group, PLC (57) ABSTRACT

A rotation detector is positioned to face a rotating object such as a crankshaft of an internal combustion engine. The rotation detector includes a sensor chip mounted on a portion extending from a holder and a magnet for supplying a biasing magnetic field to the sensor chip. Rotation of the rotating object is detected by sensing changes in the magnetic field in which the sensor chip is positioned. A projection is formed on an end surface of the holder while a depression is formed on an end surface of the magnet, and the projection and the depression are tightly engaged with each other to thereby correctly position the magnet relative to the holder. In this manner, the sensor chip is correctly and accurately positioned relative to the biasing magnet. Thus, deviations in rotation detection are minimized, and detection accuracy of the detector is improved.

9 Claims, 7 Drawing Sheets

ROTATION DETECTOR HAVING SENSOR CHIP AND BIASING MAGNET

CROSS-REFERENCE TO RELATED APPLICATION

This application is based upon and claims benefit of priority of Japanese Patent Application No. 2005-288245 filed on Sep. 30, 2005, the content of which is incorporated herein by reference.

BACKGROUND OF THE INVENTION

1. Field of the Invention

The present invention relates to a detector for detecting rotation of a rotating body such as an internal combustion engine.

2. Description of Related Art

Figure 14:
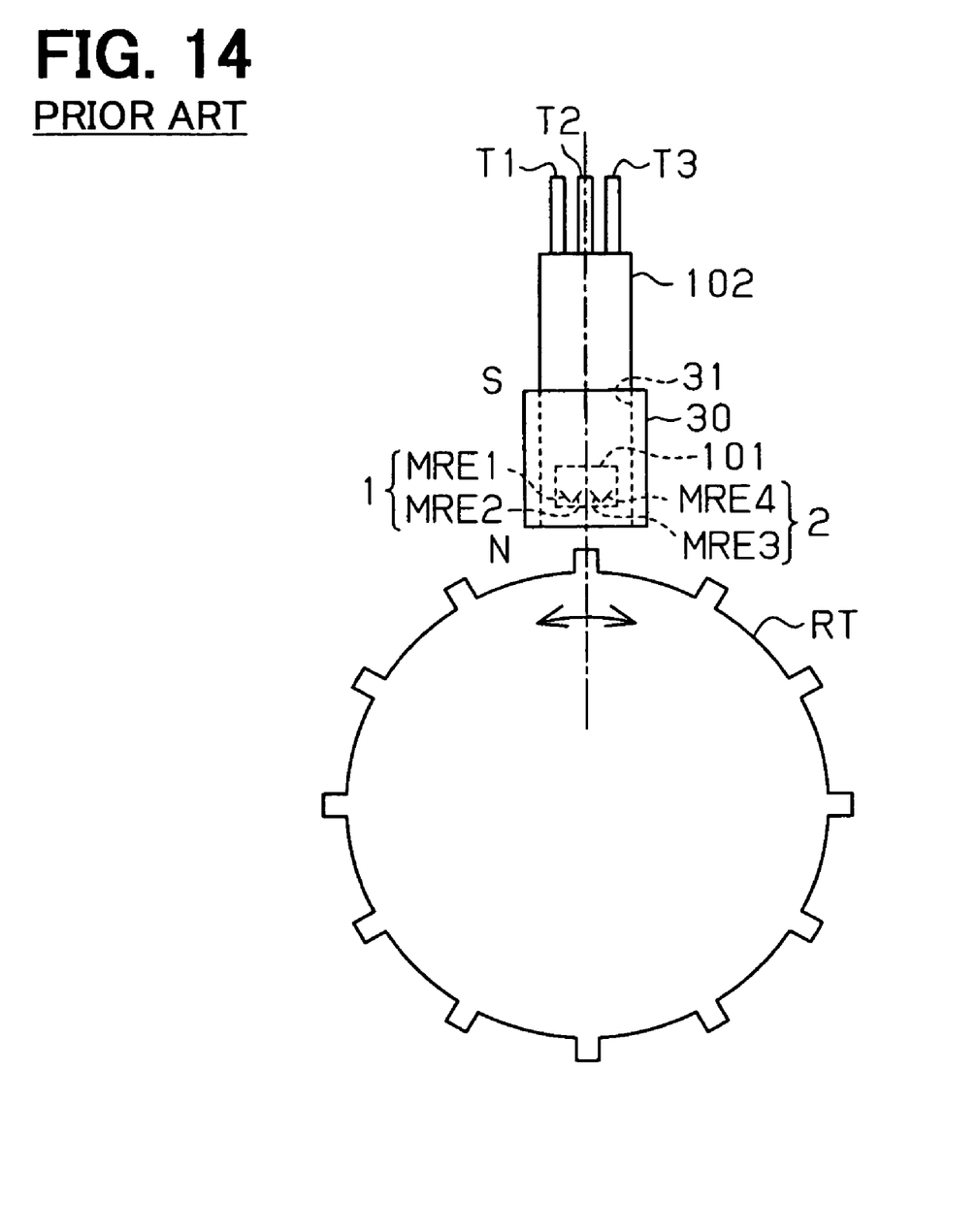
FIG. 14 is a plan view showing a relevant portion of a conventional rotation detector facing a rotor.
Figure 15:
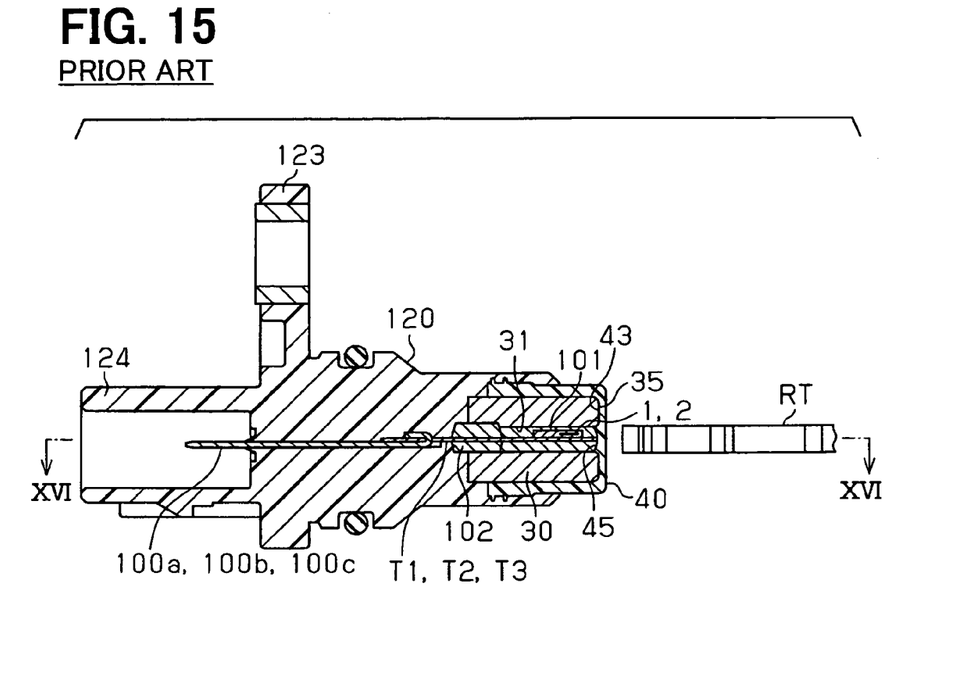
FIG. 15 is a cross-sectional view showing the conventional rotation detector shown in FIG. 14.
Figure 16:
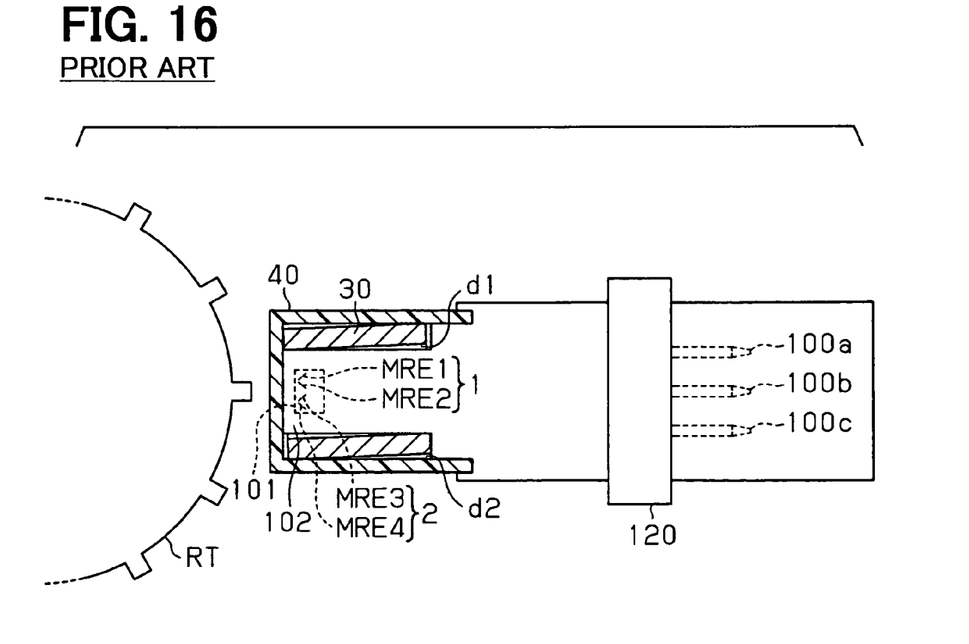
FIG. 16 is a cross-sectional view showing the conventional rotation detector shown in FIG. 14, taken along line XVI-XVI in FIG. 15.

An example of a conventional detector for detecting rotation of a rotor made of a magnetic material is shown in FIGS. 14-16. A sensor chip 101 composed of a pair 1 of magnetoresistive elements (MRE 1 and MRE 2) and another pair 2 (MRE 3 and MRE 4) is positioned to face the rotor RT made of a magnetic material and having projections formed around its outer periphery. The sensor chip 101 is integrated with a circuit for processing outputs from the sensor chip 101 and is molded with resin 102. The sensor chip 101 is electrically connected to terminals T1, T2 and T3 at an inside of the molded resin 102. The terminal T1 is a terminal for supplying electric power to the sensor chip 101, the terminal T2 is a terminal for leading out output signals from the sensor chip 101 and the terminal T3 is a ground terminal. A magnet 30 for supplying a biasing magnetic field to the sensor chip 101 is disposed around the sensor chip 101. In other words, the sensor chip 101 is disposed in a hollow space 31 formed in the magnet 30.

The sensor chip 101 molded with the resin 102 and the magnet 30 are contained in a housing to form a unitary detector unit which is mounted on an engine, for example. Such a detector unit contained in a housing 120 is shown in FIG. 15. In FIG. 15, the same or similar components as those shown in FIG. 14 have the same reference numbers. As shown in FIG. 15, the molded resin 102 and the magnet 30 are contained in a cylindrical cap 40 having a closed bottom end, and the cap 40 is molded with a resin material that forms a housing 120. The housing 120 has a flange 123 for mounting the detector unit on an engine and a connector 124 in which metallic terminals 100a, 100b, 100c are contained. The terminals T1, T2 and T3 are connected to the metallic terminals 100a, 100b and 100c, respectively.

The rotor RT is made of a magnetic material, and projections are formed on the outer periphery of the rotor. As the rotor RT facing the detector unit rotates, a magnetic field formed by the biasing magnet 30 in the MREs 1-4 changes. Electrical resistances in the MREs 1-4 change according to changes in the magnetic field. Rotation of the rotor RT is detected as the resistance changes in the MREs 1-4. Outputs form the sensor chip 101 representing rotation of the rotor is fed to a circuit for processing the output signals, and the processed signals are led out through the output terminal T2 and are fed to an electronic controller (not shown).

The conventional detector unit described above is manufactured in the following manner. The molded resin 102 including the sensor chip 101 therein, the magnet 30 and the cap 40 are separately prepared. Then, these components are assembled and molded together, thus forming the housing 120. Since these components 102, 30 and 40 have respective dimensional deviations, there is a certain deviation in a position of the magnet 30 relative to the MREs.

FIG. 16 shows a schematic cross-sectional view of the detector unit, taken along line XVI-XVI shown in FIG. 15. Due to the dimensional deviations of the respective components, gaps d1 and d2 are formed between components as shown in FIG. 16. When these components are molded together into a unitary unit, forming the housing 120, a position of the sensor chip 101 relative to the magnet 30 includes a certain dimensional deviation. It is impossible to exactly position the sensor chip 101 relative to the magnet 30. Detection accuracy of the detector unit is adversely affected by the deviation of the position of the sensor chip 101 relative to the magnet.

JP-A-9-5017 proposes a structure of a rotation detector, in which accuracy in a relative position between a sensor element and a biasing magnet is improved. In this detector, a substrate carrying a Hall element thereon is directly mounted on a housing so that the Hall element correctly faces a biasing magnet which is also mounted on the housing. However, it is unavoidable to eliminate a certain deviation in a relative position between the Hall element and the biasing magnet because both components are mounted on respective surfaces of the housing which are apart from each other.

SUMMARY OF THE INVENTION

The present invention has been made in view of the above-mentioned problem, and an object of the present invention is to provide an improved rotation detector, in which accuracy in a relative position between a sensor chip and a biasing magnet is greatly improved.

The rotation detector is used for detecting rotation of a rotating object such as a crankshaft of an internal combustion engine. The rotation detector is composed of a holder having an extending poition, a sensor unit mounted on the extending portion, a magnet for supplying a biasing magnetic field to the sensor unit, and a cup-shaped cap member for protecting the magnet and the sensor unit from ambient atmosphere. The sensor unit includes a sensor chip constituted by magenetoresistive elements and a circuit chip for processing output signals from the sensor chip. The sensor chip and the circuit chip we mounted on the extending portion as bare chips to correctly position them on the extending portion.

The magnet is cylinder-shaped and has a hollow space formed therein. The extending portion, on which the sensor unit is mounted, is disposed in the hollow space. The outer periphery of the cylindrical magnet and the sensor unit disposed in the hollow space are covered with the cup-shaped cap member to thereby protect sensor unit from the outside atmosphere. The rotation detector is positioned so that the sensor unit faces the rotating object having teeth made of a magnetic material. According to rotation of the rotating object, a magnetic field in which the sensor unit is disposed changes, and thereby rotation of the rotating object is detected.

A projected portion is formed on an end surface of the holder, and a depressed portion is formed on an end surface of the magnet. The projected portion is tightly engaged with the depressed portion to thereby accurately position the magnet relative to the holder. By accurately positioning the magnet relative to the holder, the sensor chip mounted on the portion extending from the holder is accurately positioned relative to the magnet. Since deviations in the relative position between the sensor chip and the biasing magnet are thus reduced, accuracy in the rotation detection is improved and deviations in the detection is reduced.

The engagement structure between the holder and the magnet may be variously modified. For example, the projected portion may be formed on the magnet in place of the holder, while forming the depressed portion on the holder. The projected portion and the depressed portion may be formed in a coaxial relation with respect to the outer periphery of the cylindrical magnet. Small projections or depressions may be formed around the engagement surfaces to prevent relative rotation between the holder and the magnet. The holder and the magnet may be connected with adhesive or by seizing.

According to the present invention, the sensor chip is correctly positioned relative to the biasing magnet. Therefore, detection accuracy of the rotation detector is improved. Other objects and features of the present invention will become more readily apparent from a better understanding of the preferred embodiments described below with reference to the following drawings.

DETAILED DESCRIPTION OF THE PREFERRED EMBODIMENTS

Figure 1:
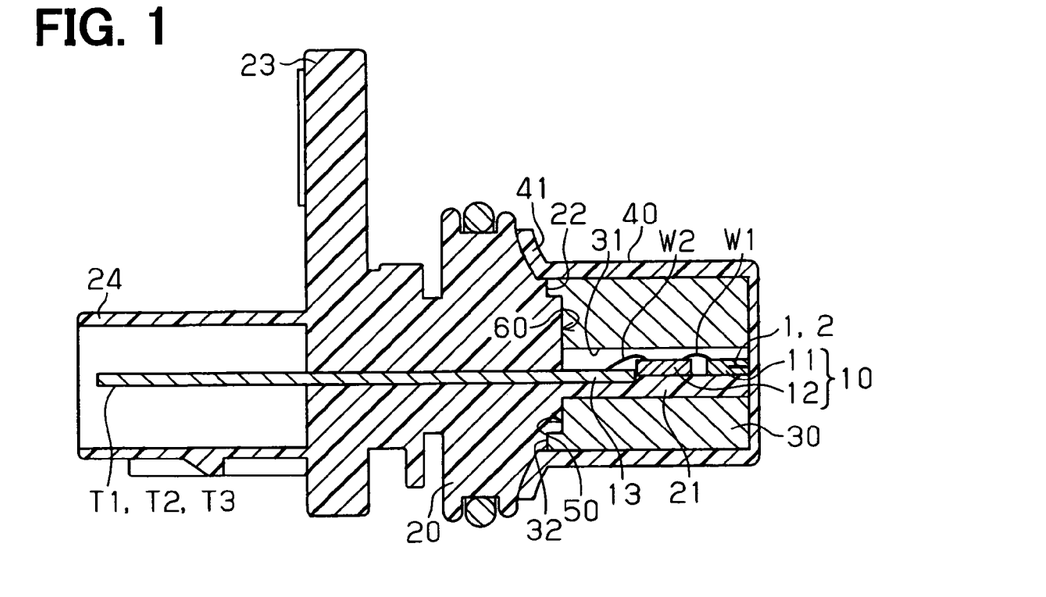
FIG. 1 is a cross-sectional view showing an entire structure of a rotation detector as a first embodiment of the present invention.

A first embodiment of the present invention will be described with reference to FIGS. 1 and 2. The rotation detector shown in FIG. 1 is a rotation detector to be mounted on an internal combustion engine for detecting a rotational speed of a crankshaft or the like. In this rotation detector, a sensor unit 10 in bare chips and a biasing magnet 30 are hermetically held in a housing composed of a holder 20 and a cap member 40. The sensor unit 10 is composed of a sensor chip 11 having an MRE (magnetoresistive element) pair 1 and another MRE pair 2, and a circuit chip 12 for processing output signals from the sensor chip 11.

The holder 20 is made of a non-magnetic material such as resin or ceramics, and has a flange 23 for mounting the detector on an engine and a connector 24 for electrically connecting the detector to an outside electronic control unit. The holder 20 also has an extending portion 21 extending from a holder body toward the cap member 40. A reed frame 13 and a mounting surface for mounting the sensor chip 11 and the circuit chip 12 thereon are integrally molded with the extending portion 21. The sensor chip 11 and the circuit chip 12 as bare chips are mounted on the mounting surface and electrically connected to the reed frame 13. More particularly, the sensor chip 11 and the circuit chip 12 are connected with a bonding wire W1, and the circuit chip 12 and the reed frame 13 are connected with a bonding wire W2. The sensor chip 11 and the circuit chip 12 are aligned in line on the mounting surface of the extending portion 21, the sensor chip 11 being positioned at a tip of the extending portion 21.

The reed frame 13 is formed as apart of metallic terminals for electrically connecting the detector to the outside circuit. The terminals include a terminal T1 for supplying electric power to the sensor unit 10, a terminal T2 for leading out output signals from the sensor unit 10 and a ground terminal T3. A rewritable non-volatile memory such as an EPROM is included in the circuit chip 12. Adjusting data are written from outside through a terminal T4 (shown in FIG. 2). The adjusting data include (a) data for adjusting an offset of a differential amplifier in the circuit chip 12, (b) data for adjusting a threshold level of a comparator in the circuit chip 12, and (c) data for compensating deviations due to temperature changes in the circuit. Detection accuracy of the detector is improved by using these adjusting data.

The magnet 30 is in a cylindrical shape having a hollow space 31 therein. The hollow space 31 has a rectangular cross-section, for example. The extending portion 21, on which the sensor unit 10 is mounted, is inserted into the hollow space 31. The magnet 30 supplies to the sensor chip 11 a biasing magnetic field which changes according to a rotation of a rotor such as the one shown in FIG. 14. Changes in the magnetic field are converted into changes in electrical resistances of the magnetoresistive elements in the sensor chip 11.

The cap member 40 is made of a non-magnetic material such as resin or ceramics and is shaped in a cylinder having a closed bottom end and an open end 41. The open end 41 is tightly connected to the holder 20, and thereby the sensor unit 10 mounted on the extending portion 21 and the magnet 30 are protected from the ambient atmosphere.

Figure 2:
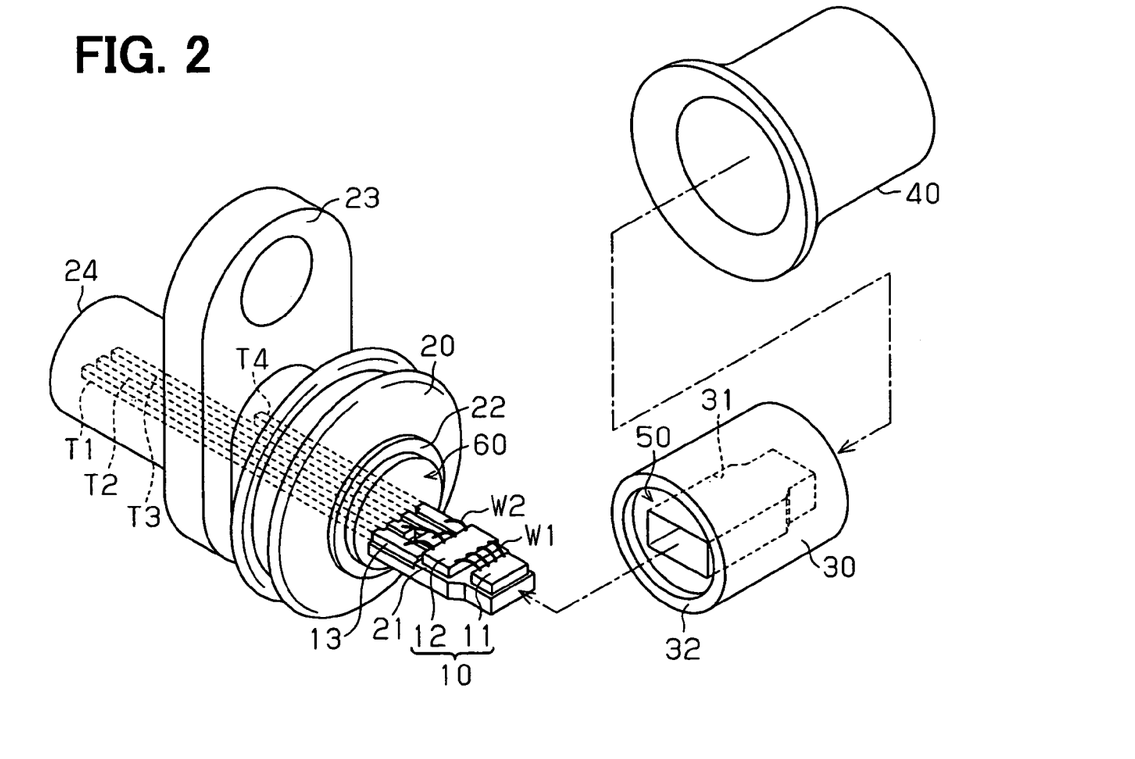
FIG. 2 is a perspective view showing the rotation detector shown in FIG. 1, its components being separated.

FIG. 2 shows the components of the detector before being assembled. As shown in both FIGS. 1 and 2, a projected portion 60 is formed on an end surface 22 of the holder 20, and a depressed portion 50 is formed on an end surface 32 of the magnet 30. The depressed portion 50 is formed in a coaxial relation with an outer periphery of the cylindrical magnet 30. The projected portion 60 tightly engages with the depressed portion 50, so that the magnet 30 is exactly positioned relative to the end surface 22 of the holder 20. The extending portion 21 is inserted into the hollow space 31 of the magnet 30, and then the magnet 30 is covered with the cap member 40. Since the sensor chip 11 is exactly positioned on the extending portion 21 and the magnet 30 is exactly positioned relative to the extending portion, the position of the sensor chip 11 is set relative to the magnet 30 with high accuracy.

The following advantages are attained in the embodiment described above. (1) Since the projected portion 60 of the holder 20 is tightly engaged with the depressed portion 50 of the magnet, the magnet 30 is accurately positioned relative to the sensor chip 11 mounted on the extending portion 21. (2) Since the sensor chip 11 is mounted on the extending portion 21 in a form of a bare chip, the sensor chip 11 is accurately positioned on the extending portion 21. If the sensor chip 11 were molded with resin before mounting on the extending portion 21, a strain due to an internal stress would not be neglected. (3) Since the sensor unit 10 is hermetically covered with the cap member 40 though the sensor unit 10 is mounted on the extending portion 21 in a form of bare chips, the sensor unit 10 is well protected form the outside atmosphere. (4) Since the projected portion 60 and the depressed portion 50 are formed in a coaxial relation with respect to the outer periphery of the magnet 30, a relative movement of end surfaces 22 and 32 is well restrained.

Figure 3:
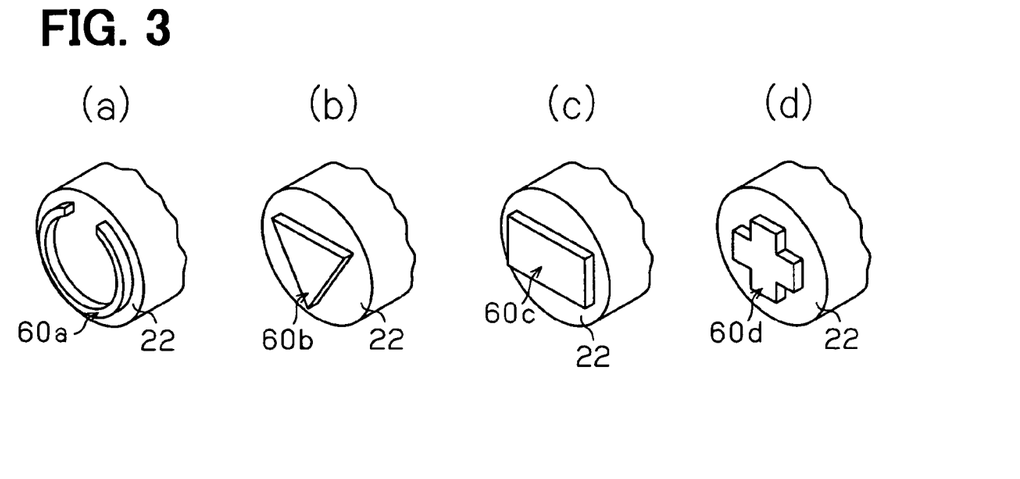
FIGS. 3(a)-(d), each shows a modified form of the first embodiment.

The engagement structure between the holder 20 and the magnet 30 may be variously modified. FIGS. 3(a)-(d) show some modified forms of the projection formed on the end surface 22 of the holder 20. A depression corresponding to each projection is formed on the end surface 32 of the magnet 30 though it is not shown in the drawings. In FIG. 3(a), a circular projection 60a having an open portion is formed. A triangle projection 60b, a rectangular projection 60c and a cross-shaped projection 60d are formed on the end surface 22 in FIGS. 3(b), (c) and (d), respectively. A relative movement between the holder 20 and the magnet 30 is surely prevented by any one of these engagement structures.

Figure 4:
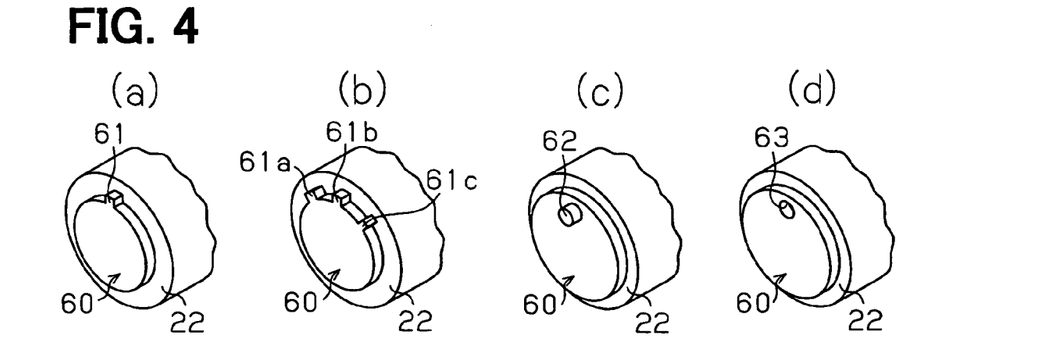
FIGS. 4(a)-(d), each shows a modified form of the first embodiment.

Another type of modified forms of the engagement structure is shown in FIGS. 4(a)-(d). In these modified forms, a structure for preventing a relative rotation between the holder 20 and the, magnet 30 is added to the engagement structure in the first embodiment. That is, a partial projection 61, three partial projections 61a, 61b, 61c, and a projection 62 in the axial direction are added to the projected portion 60 in FIGS. 4(a), (b) and (c), respectively. A depression corresponding to each projection is formed on the depressed portion 50 though it is not shown in the drawings. In FIG. 4(d), a small depression 63 is added to the projected portion 60. A relative rotation between the holder 20 and the magnet 30 is surely prevented by any one of the structures shown in FIGS. 4(a)-(d).

Figure 5:
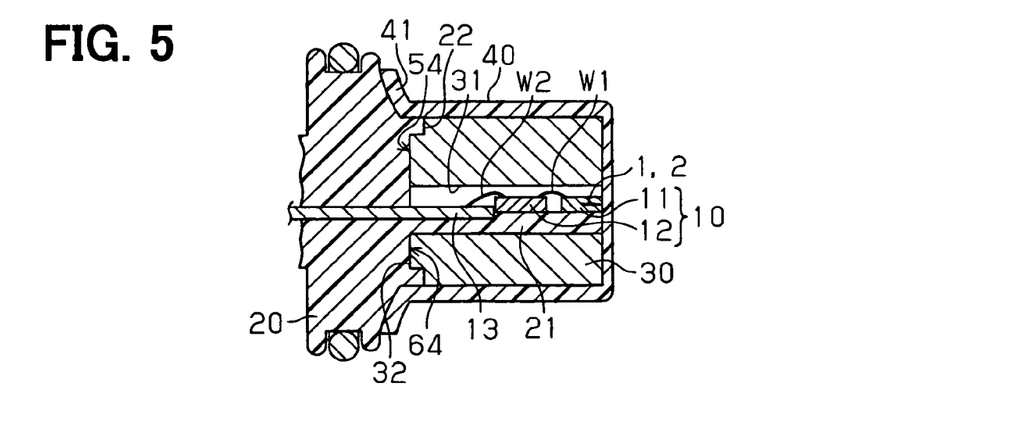
FIG. 5 is a cross-sectional view showing a relevant portion of a rotation detector as a second embodiment of the present invention.

A second embodiment of the present invention will be described with reference to FIG. 5. In this embodiment, a depressed portion 64 is formed, in place of the projected portion 60 in the first embodiment, on the end surface 22 of the holder 20, and a projected portion 54 is formed, in place of the depressed portion 50 in the first embodiment, on the end surface 32 of the magnet 30. The holder 20 and the magnet 30 are connected to each other, keeping a correct relative position, by engaging the projected portion 54 with the depressed portion 64. Other structures are the same as those of the first embodiment. The same advantages as attained in the first embodiment are attained in this second embodiment, too. The modifications shown in FIGS. 3 and 4 can be similarly applied to the second embodiment, too.

Figure 6:
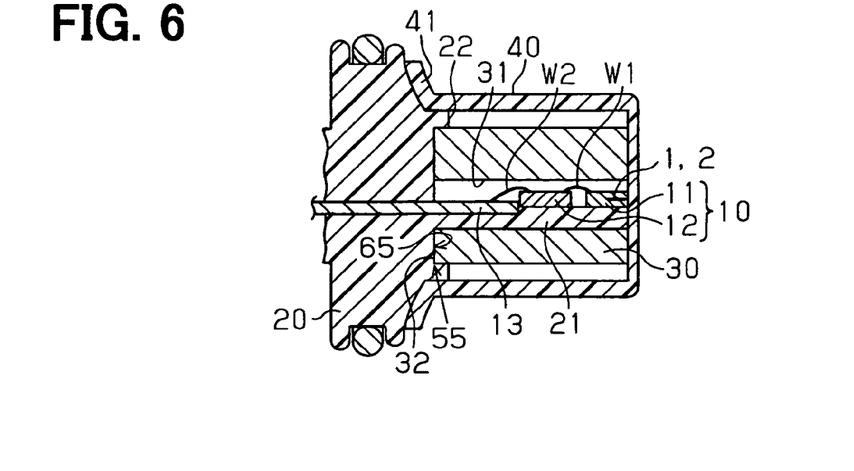
FIG. 6 is a cross-sectional view showing a relevant portion of a rotation detector as a third embodiment of the present invention.

A third embodiment of the present invention will be described with reference to FIG. 6. In this embodiment, the end surface 32 of the magnet 30 is used as an engaging portion 55 that engages with a depressed portion 65 formed on the end surface 22 of the holder 20. It is not necessary, in this embodiment, to form an engaging portion (a depressed portion or a projected portion) on the end surface 32 of the magnet. Other structures are the same as those of the foregoing embodiments. The same or similar advantages attained in the foregoing embodiments are attained in this embodiment, too. The modifications shown in FIGS. 3 and 4 can be similarly applied to this third embodiment, too.

A fourth embodiment of the present invention will be described with reference to FIG. 7. In this embodiment, the holder 20 and the magnet 30 are connected with adhesive. The engagement between the holder 20 and the magnet 30 are made in the same manner as in the first embodiment, i.e., by engaging the projected portion 60 of the holder 20 with the depressed portion 50 of the magnet 30. In this embodiment, a circular groove 72 is additionally formed on the end surface 22 of the holder 20, and another circular groove 71 is formed on the end surface 32 of the magnet 30, so that excessive adhesive applied to the engaging surfaces flows into the circular grooves 71, 72. Other structures are the same as those of the first embodiment. The same or similar advantages attained in the foregoing embodiments are attained in this embodiment, too. In addition, the connection between the holder 20 and the magnet 30 is further firmly made in this embodiment because the adhesive is applied to the engaging surfaces.

Figure 7:
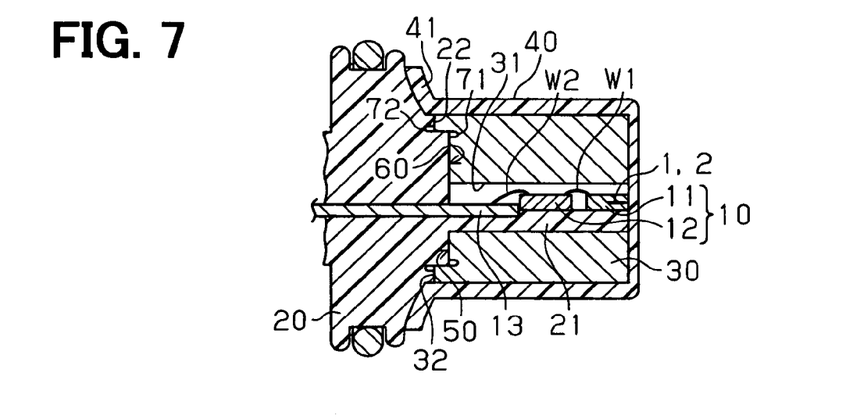
FIG. 7 is a cross-sectional view showing a relevant portion of a rotation detector as a fourth embodiment of the present invention.
Figure 8:
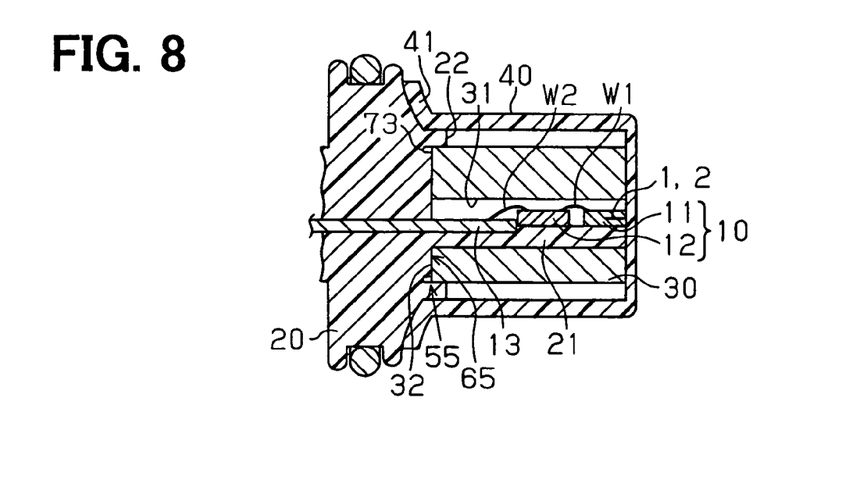
FIG. 8 is a cross-sectional view showing a modified form of the fourth embodiment shown in FIG. 7.

The fourth embodiment shown in FIG. 7 may be modified to a form shown in FIG. 8. In this modified form, the end surface 32 of the magnet is directly used as the engaging portion 55 in the same manner as in the third embodiment shown in FIG. 6. A circular groove 73 for accommodating the excessive adhesive is formed on the end surface 22 of the holder 20 as done in the fourth embodiment.

Figure 9:
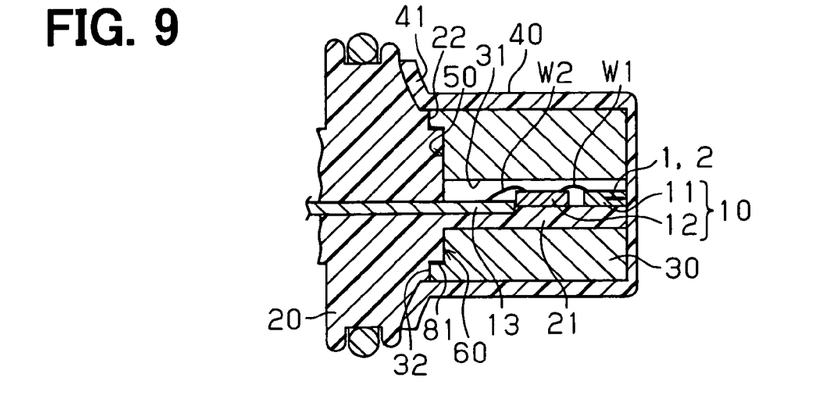
FIG. 9 is a cross-sectional view showing a relevant portion of a rotation detector as a fifth embodiment of the present invention.

A fifth embodiment of the present invention is shown in FIG. 9. In this embodiment, the engagement structure between the holder 20 and the magnet 30 is the same as that of the first embodiment. That is, the projected portion 60 formed on the end surface 22 of the holder 20 is engaged with the depressed portion 50 formed on the end surface 32 of the magnet 30. In this embodiment, the holder 20 and the magnet 30 are further firmly connected by seizing after both are engaged. A seized portion 81 is formed at aside surface of the projected portion 60 as shown in FIG. 9. The same advantages as attained in the foregoing embodiments are attained in this embodiment, too. In addition, the holder 20 and the magnet 30 are further firmly connected by seizing.

Figure 10:
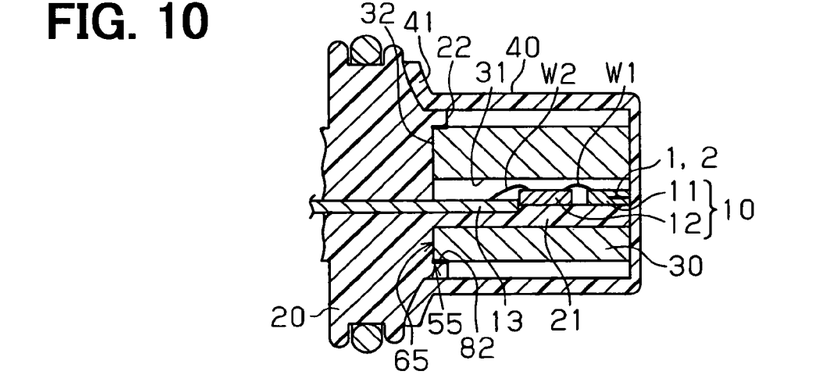
FIG. 10 is a cross-sectional view showing a modified form of the fifth embodiment shown in FIG. 9.

The fifth embodiment shown in FIG. 9 may be modified to a form shown in FIG. 10. In this modified form, the end surface 32 is used as the engaging portion 55 that engages with the depressed portion 65 formed on the end surface 22 of the holder 20 in the same manner as in the third embodiment shown in FIG. 6. The holder 20 and the magnet 30 are connected to each other after they are engaged, forming a seized portion 82 at a side surface of the depressed portion 65 as shown in FIG. 10.

Figure 11:
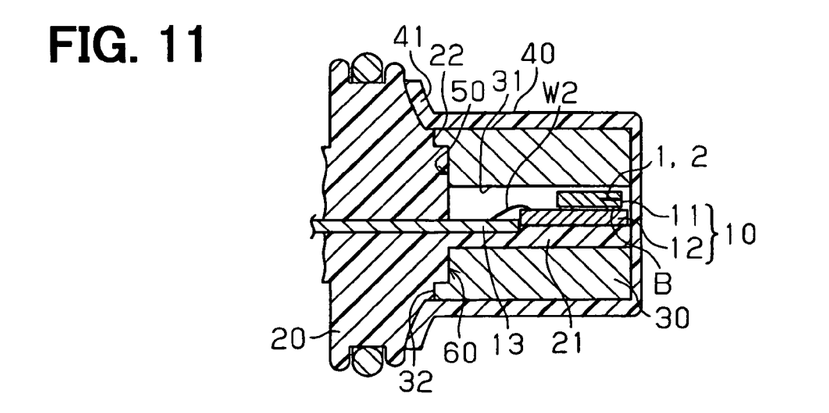
FIG. 11 is a cross-sectional view showing a relevant portion of a rotation detector as a sixth embodiment of the present invention.

A sixth embodiment of the present invention will be described with reference to FIG. 11. In this embodiment, the sensor chip 11 and the circuit chip 12 are mounted on the extending portion 21 by stacking, as opposed to aligning them in flat in the first embodiment. The circuit chip 12 is directly mounted on the extending portion 21, and then the sensor chip 11 is stacked on the circuit chip 12. The sensor chip 11 is electrically connected to the circuit chip 12 via bump electrodes B, and the circuit chip 12 is electrically connected to the reed frame 13 via the bonding wire W2. Other structures are the same as those of the first embodiment shown in FIG. 1. The same advantages as attained in the foregoing embodiments are similarly attained in this embodiment. In addition, in this embodiment, an axial length of the extending portion 21 can be made shorter because the sensor chip 11 is stacked on the circuit chip 12. The sensor chip 11 can be correctly positioned on the extending portion 21 in this manner, too.

Figure 12:
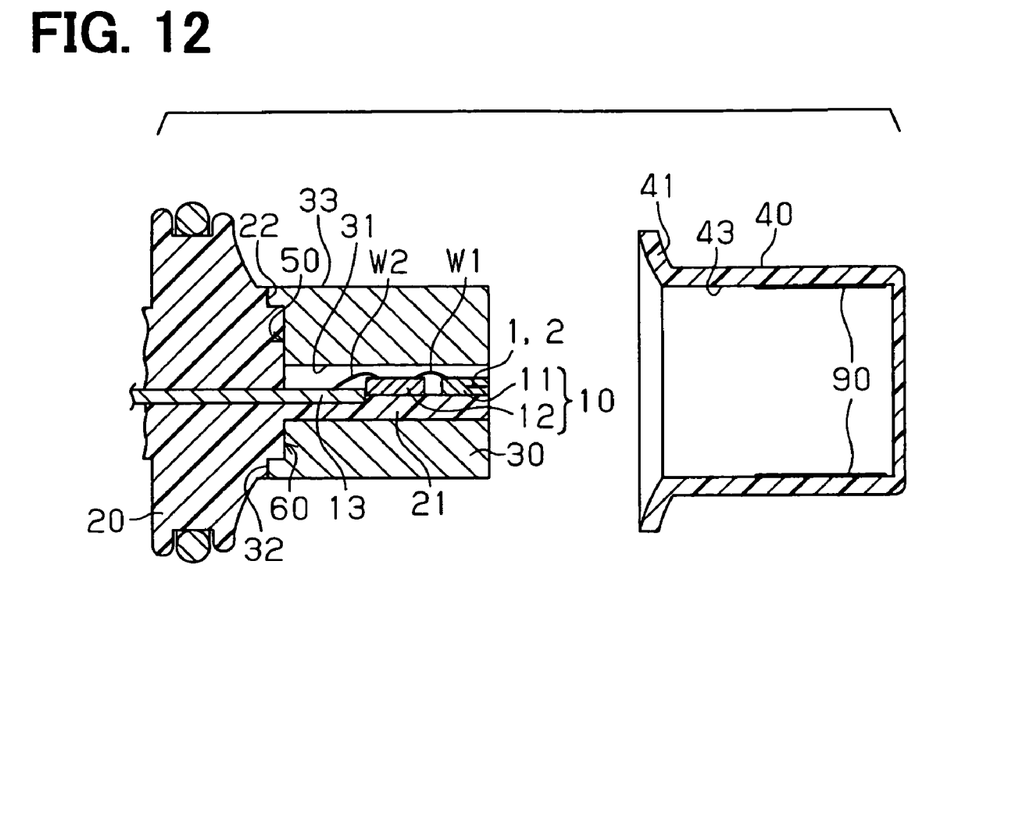
FIG. 12 is a cross-sectional view showing a relevant portion of a rotation detector as a seventh embodiment of the present invention, its cap member being separated from a holder and a magnet.

A seventh embodiment of the present invention will be described with reference to FIG. 12. In this embodiment, the cap member 40 is press-fitted to the outer periphery 33 of the magnet 30 after the magnet 30 is connected to the holder 20. A press-fitting surface 90 that has a diameter little smaller than the inner bore 43 of the cap member 40 is formed. After forcibly covering the magnet 30 with the cap member 40, the open end 41 of the cap member is connected to the holder 20. Other structures are the same as those of the first embodiment shown in FIG. 1. The same advantages as attained in the first embodiment are attained in this embodiment, too. In addition, in this embodiment, the cap member 40 is firmly connected to the magnet 30 without becoming loose even under a high vibration.

Figure 13:
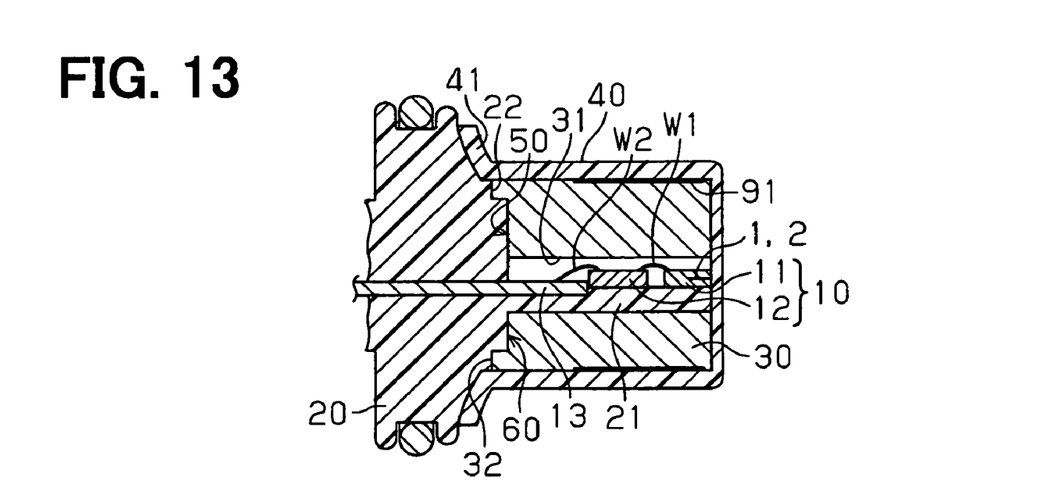
FIG. 13 is a cross-sectional view showing a modified form of the seventh embodiment shown in FIG. 12.

A modified form of the seventh embodiment is shown in FIG. 13. In this embodiment, the cap member 40 is connected to the magnet 30 with adhesive 91 disposed between the inner bore 43 of the cap member 40 and the outer periphery 33 of the magnet 30. Other structures are the same as those of the seventh embodiment shown in FIG. 12.

The present invention is not limited to the embodiments described above, but it may be variously modified. For example, the circular grooves 71, 72 or 73 for accommodating excessive adhesive provided in the fourth embodiment (FIG. 7) and its modified form (FIG. 8) may be omitted, if an amount of the adhesive is properly controlled not to adversely affect a positional accuracy of the engagement. The sensor chip 11 may be mounted on the extending portion 21 in other ways than those described above, as long as the magnetoresistive element pairs 1 and 2 in the sensor chip 11 are correctly positioned. The magnet 30 is not limited to the cylindrical shape having the hollow space 31 having a rectangular cross-section. The shape of the magnet 30 may be variously modified as long as the extending portion 21 on which the sensor unit 10 is mounted is well accommodated therein.

The engagement structure between the holder 20 and the magnet 30 may be further modified to various forms as long as the magnet 30 is correctly positioned relative to the holder 20. The sensor chip 11 can be correctly positioned relative to the magnet 30 when the magnet 30 is correctly positioned relative to the holder 20. For example, plural projections and depressions constituting the engagement structure may be formed on both the end surface 22 of the holder 20 and the end surface 32 of the magnet 30. The sensor chip 11 constituted by magnetoresistive elements may be replaced with other devices, such as a Hall element or a pick-up coil generating voltage according to changes in a magnetic field.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotation detector comprising:
a sensor unit, including a sensor chip and a circuit chip, for detecting changes in a magnetic field;
a magnet for supplying a biasing magnetic field to the sensor unit, the magnet being in a cylindrical shape having a hollow space therein;
a holder, made of a non-magnetic material, having a holder body and an extending portion extending from the holder body, the extending portion being disposed in the hollow space in the magnet, the sensor unit being mounted on the extending portion;
a reed frame held in the holder body and extending along the extending portion, the reed frame including a terminal for supplying electric power to the sensor unit and a terminal for leading out output signals from the sensor unit;
a cap member for covering the magnet and the sensor unit to protect those from ambient atmosphere; and
means for keeping a position of the magnet relative to the holder, wherein:
the position keeping means is an engagement structure between the holder and the magnet, and
the engagement structure is constituted by a projected portion formed on the holder and a depressed portion formed on the magnet, the projected portion being engaged with the depressed portion.

2. The rotation detector as in claim 1, wherein:
the projected portion formed on the holder has a polygon plane, and the depressed portion formed on the magnet has a polygon plane corresponding to the polygon plane of the projected portion.

3. The rotation detector as in claim 1, wherein:
the projected portion formed on the holder has a circular plane that is coaxial with an outer periphery of the cylindrical magnet, and the depressed portion formed on the magnet has a circular plane corresponding to the circular plane of the projected portion.

4. The rotation detector as in claim 1, wherein:
the holder and the magnet are connected to each other with adhesive.

5. The rotation detector as in claim 4, wherein:
the engagement structure further includes a circular groove for accommodating excessive adhesive therein.

6. The rotation detector as in claim 1, wherein:
the holder and the magnet are connected to each other by seizing.

7. A rotation detector comprising:
a sensor unit, including a sensor chip and a circuit chip, for detecting changes in a magnetic field;
a magnet for supplying a biasing magnetic field to the sensor unit, the magnet being in a cylindrical shape having a hollow space therein;
a holder, made of a non-magnetic material, having a holder body and an extending portion extending from the holder body, the extending portion being disposed in the hollow space in the magnet, the sensor unit being mounted on the extending portion;
a reed frame held in the holder body and extending along the extending portion, the reed frame including a terminal for supplying electric power to the sensor unit and a terminal for leading out output signals from the sensor unit;
a cap member for covering the magnet and the sensor unit to protect those from ambient atmosphere; and
means for keeping a position of the magnet relative to the holder, wherein:
the position keeping means is an engagement structure between the holder and the magnet, and
the engagement structure is constituted by a depressed portion formed on the holder and a projected portion formed on the magnet, the depressed portion being engaged with the projected portion.

8. A rotation detector comprising:
a sensor unit, including a sensor chip and a circuit chip, for detecting changes in a magnetic field;
a magnet for supplying a biasing magnetic field to the sensor unit, the magnet being in a cylindrical shape having a hollow space therein;

a holder, made of a non-magnetic material, having a holder body and an extending portion extending from the holder body, the extending portion being disposed in the hollow space in the magnet, the sensor unit being mounted on the extending portion;

a reed frame held in the holder body and extending along the extending portion, the reed frame including a terminal for supplying electric power to the sensor unit and a terminal for leading out output signals from the sensor unit;

a cap member for covering the magnet and the sensor unit to protect those from ambient atmosphere; and means for keeping a position of the magnet relative to the holder, wherein:

the position keeping means is an engagement structure between the holder and the magnet, and the engagement structure is constituted by an end surface of the magnet and a depressed portion formed on the holder, the end surface of the magnet being engaged with the depressed portion.

9. A rotation detector comprising:

a sensor unit, including a sensor chip and a circuit chip, for detecting changes in a magnetic field;

a magnet for supplying a biasing magnetic field to the sensor unit, the magnet being in a cylindrical shape having a hollow space therein;

a holder, made of a non-magnetic material, having a holder body and an extending portion extending from the holder body, the extending portion being disposed in the hollow space in the magnet, the sensor unit being mounted on the extending portion;

a reed frame held in the holder body and extending along the extending portion, the reed frame including a terminal for supplying electric power to the sensor unit and a terminal for leading out output signals from the sensor unit;

a cap member for covering the magnet and the sensor unit to protect those from ambient atmosphere; and means for keeping a position of the magnet relative to the holder, the position keeping means being an engagement structure between the holder and the magnet including a projected portion formed on the holder and a depressed portion formed on the magnet, the projected portion being engaged with the depressed portion, wherein the projected portion formed on the holder has a circular plane that is coaxial with an outer periphery of the cylindrical magnet, and the depressed portion formed on the magnet has a circular plane corresponding to the circular plane of the projected portion, and the projected portion includes a projection or a depression which engages with a corresponding depression or projection formed in the depressed portion for preventing a relative rotation between the holder and the magnet.

* * * * *